United States Patent [19]
Bebech

[11] 3,919,084
[45] Nov. 11, 1975

[54] RAPID SETTLER APPARATUS

[76] Inventor: Michael J. Bebech, R.D. No. 1, Box 73, Masury, Ohio 44438

[22] Filed: Jan. 22, 1974

[21] Appl. No.: 435,457

[52] U.S. Cl. .................. 210/73; 210/84; 210/305; 210/519; 210/521
[51] Int. Cl. ........................................... C02c 1/27
[58] Field of Search .......... 210/73, 74, 83, 84, 251, 210/294, 305, 322, 332, 407, 519, 521, 522

[56] References Cited
UNITED STATES PATENTS

| 863,168 | 8/1909 | Griswold, Jr. | 210/521 X |
|---|---|---|---|
| 1,248,374 | 11/1917 | Moore | 210/83 X |
| 2,195,739 | 4/1940 | Rolston | 210/83 X |
| 2,207,399 | 7/1940 | Gaertner | 210/84 X |
| 3,482,700 | 12/1969 | Bebech | 210/407 X |
| 3,796,316 | 3/1974 | Matz | 210/332 |

FOREIGN PATENTS OR APPLICATIONS

| 117,538 | 8/1899 | Germany | 210/521 |
|---|---|---|---|
| 19,179 | 2/1905 | Germany | 210/521 |
| 578,205 | 6/1946 | United Kingdom | 210/521 |

*Primary Examiner*—Charles N. Hart
*Assistant Examiner*—Robert H. Spitzer
*Attorney, Agent, or Firm*—Oldham, & Oldham Co.

[57] ABSTRACT

This apparatus includes a number of flat vertically positioned separator modules each having a plurality of vertically spaced separator chambers therein each having downwardly and inclined stacked settler trays within the chambers and a center solids collecting zone is provided as well as a bottom solids discharge outlet, conduit means extend upwardly of the separator for flow of the liquid-solids mix upwardly from one chamber to the adjacent vertically above chamber for series flow of the solids-liquid mix through the module; while collector and distributor means connect to a plurality of the modules at the discharge outlets for receiving the thickened liquid-solids mix therefrom. Alternate compaction means connect to the collector and distributor means for receiving the thickened liquid-solids mix therefrom and further separating the liquids therefrom for ultimate discharge of the compacted solids.

The individual modules and the particular flow patterns therein and the provision of pluralities of stacked inwardly and downwardly inclined separation trays in each of the separation compartments formed in the elongated enclosure modules is a further portion of the invention.

10 Claims, 10 Drawing Figures

RAPID SETTLER APPARATUS

BACKGROUND OF THE INVENTION

Heretofore there have been many different types of separators provided for separating solids from varying types of liquid-solid mixtures, suspensions of solids in liquids, and other compositions including liquid carriers having various types of suspended materials therein.

One of such prior types of separators is termed a Lamalla separator and various types of sheets and flow patterns are provided in Lamalla separators for solids separation and deposit from the liquid-solids mixture being processed. However, improvements in the settling rates and flow efficiency in the separators are desirable.

The general object of the present invention is to provide an improved, rapid acting separator for efficiently processing liquid-solids mixtures for effective deposit of the solids from the mixture and collection of the same for discharge action.

Another object of the invention is to provide a rapid settler made from a plurality of separator modules each of which has a plurality of vertically spaced separator chambers therein with means for producing flow of the liquid-solids mix initially to the bottom separator chamber, to the next vertically adjacent intermediate chamber, thence to the next vertically adjacent chamber, and ultimately to the top chamber in the enclosure for discharge of liquid therefrom.

Another object of the invention is to provide relatively low cost but efficient settler modules for use in settler apparatus, each including a large number of vertically short settling areas, and wherein any desired number of the separator modules can be used in the apparatus for connection to a common thickened liquid-solids mixture for ultimate final separation of liquids from the mix and discharge of the separated solid materials.

Further objects of the invention are to provide an improved separator apparatus including vertically aligned separator chambers each having laterally inwardly and downward flow through a plurality of stacked trays in the separator chambers and with the separated solids depositing on the trays and sliding down to an open center area in the module, with adjacent chambers in the module having small openings in the bottom trays thereof for collection and discharge of the separated solids downwardly of the module in an open center area thereof; to provide an improved collector and distributor member for a thickened solids-liquid mixture being processed; to provide an improved ultimate compactor of the solids in the thickened liquid-solids mix; and to provide a compacting specialized piston in the compaction-separation chamber; to provide means in the compaction chamber for release of collected solids from the compacting piston therein; and to provide an efficient sturdy, dependable type of a settler apparatus having a minimum of maintenance with automatic separation of substantially all of the solids from a liquid-solids mixture being processed.

The foregoing and other objects and advantages of the invention will be made more apparent as the specification proceeds.

Reference now is particularly directed to the accompanying drawings wherein.

When referring to corresponding members shown in the drawings and referred to in the specification, corresponding numerals are used to facilitate comparison therebetween.

INVENTIVE SUBJECT MATTER

The invention, as one embodiment thereof, relates to a solids settler apparatus for liquid-solids mixtures of various types and comprising a plurality of abutted flat separator modules each including a plurality of vertically spaced separator chambers therein each of which includes downwardly and inwardly inclined stacked settler trays therein, a center solids collecting zone, and a bottom solids discharge outlet as well as means for progressively causing the flow of the liquid-solids mix to the laterally outer margins of the lowermost separator chamber, thence to the vertically adjacent separator chamber and downwardly thereinto and corresponding conduit means for controlled flow of the mix for a continued similar flow pattern through the settler module; a collector means positioned below and connecting to the discharge outlets of the plurality of the modules for receiving a thickened liquid-solids mix therefrom, a distributor means having a pair of alternate outlets positioned below and connected to the connector means and individual compaction means connecting to the individual ones of the outlets for receiving the thickened liquid-solids mix therefrom and further separating liquid therefrom for compaction of the solids and discharge of the compacted solids.

The invention further comprises the particular construction of the separator modules and the conduit means connecting to a center opening in the module at the upper end of the lowest chamber and extending upwardly and then downwardly therefrom to connect to the vertically adjacent intermediate chamber at the lateral outer margins thereof and additional conduit means further connecting each separator chamber to the next vertically adjacent chamber for controlled flow of the mix through the separator, the bottom walls of all of the chambers forming vertically aligned superimposed V-shaped members and having a plurality of spaced small apertures at the apex of the V for separated solids to drop therethrough, the solids deposited on the individual trays gradually sliding downwardly thereof and falling downwardly in the center opening in the module, a solids deposit opening being provided at the center of the lowermost chamber, and an outlet means operatively connecting to the center opening of the module at the upper end thereof.

SETTLER APPARATUS COMPONENTS

Figure 1:
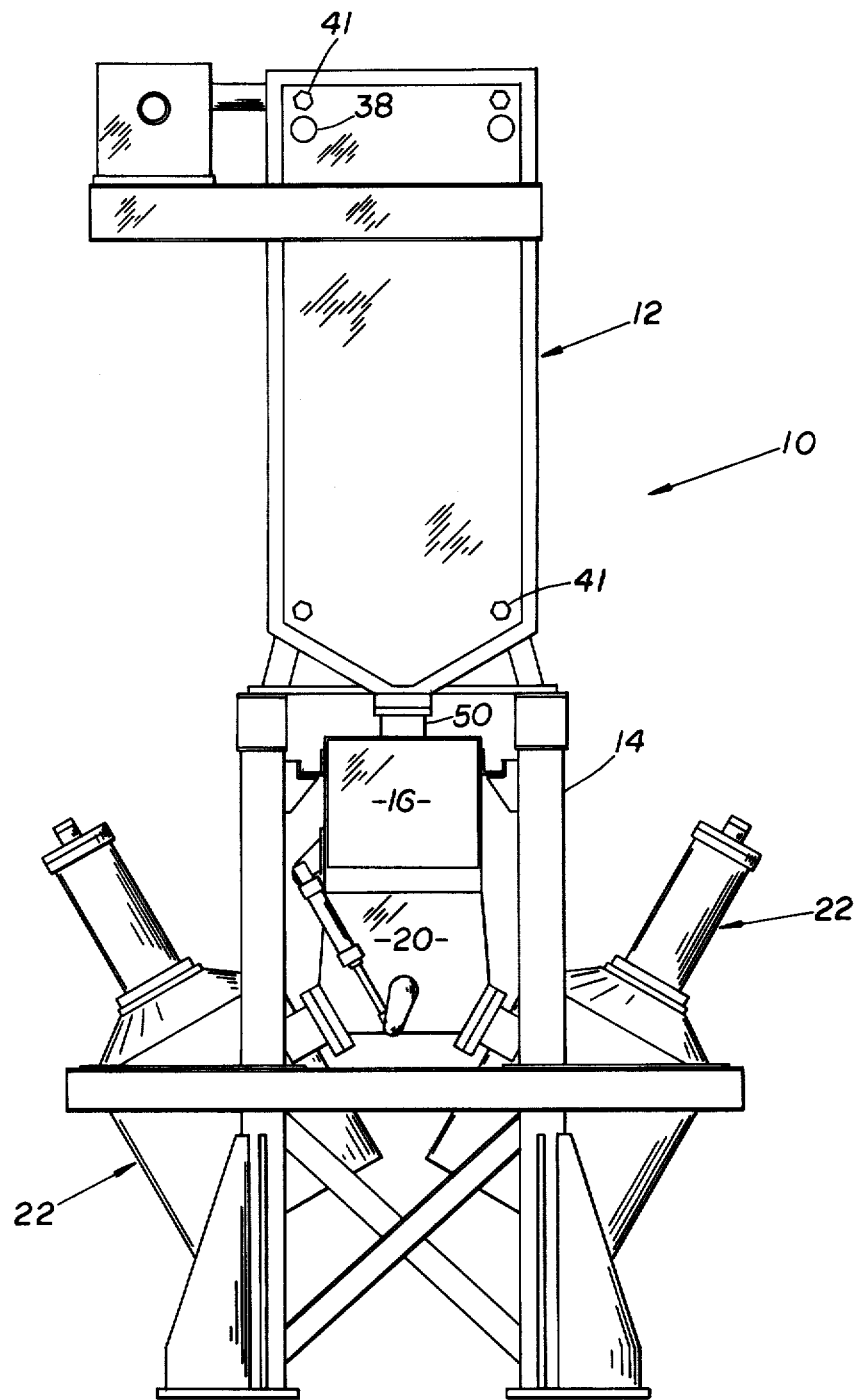
FIG. 1 is an elevation of the settler apparatus of the invention and the associated means used in connection therewith.

With reference to the structure shown in FIG. 1 of the drawings, a settler apparatus is indicated as a whole by the numeral 10. This apparatus includes a pluality of separator modules 12 that are suitably positioned on a frame means 14. The frame 14 also supports a collector means 16 connecting to the discharge outlets 18 of a plurality of the modules 12 to receive a thickened liquid-solids mix therefrom and the collector means 16 connects to a distributor means 20 positioned below and receiving the thickened liquid-solids mixture from the collector means. A pair of individual compaction means 22 are individually connected to the individual and alternate discharge openings or outlets provided for the distributor means 20 at opposed portions thereof for alternately receiving the thickened liquid-solids mix therefrom for final separation of liquid from the thickened mixture and ultimate discharge of the compacts solids therefrom, all as hereinafter described in more detail.

SEPARATOR MODULES

The settler 10 normally includes a plurality of laterally abutted separator modules 12. Each of these modules 12 comprises an elongated enclosure formed from a side wall 30 and a pair of end or edge walls 34 and 36 suitably secured as by welding to the side wall 30 in the initial assembly of the module components. Such enclosure has a suitable inlet 38 formed therein in the side wall 30 thereof at or adjacent the upper end of the module. The enclosure is completed as described hereinafter.

A plurality of vertically spaced generally V-shaped settling chambers are formed in each of the enclosure modules 12 as by bottom walls 40 in a lowermost chamber 42 and by V-shaped connecting bottom walls 40a in an intermediate chamber 42a directly above the bottom chamber 42. A plurality of these chambers 42, 42a, 42b, etc. are formed in vertically spaced stacked or superimposed relationship in the module and ultimately terminating in the top chamber 42g in the module as shown. Each of these chambers, except for the lowermost chamber 42, has the bottom walls thereof suitably secured together and to the side wall 30 to form an apex at the center area of the module.

Figure 2:
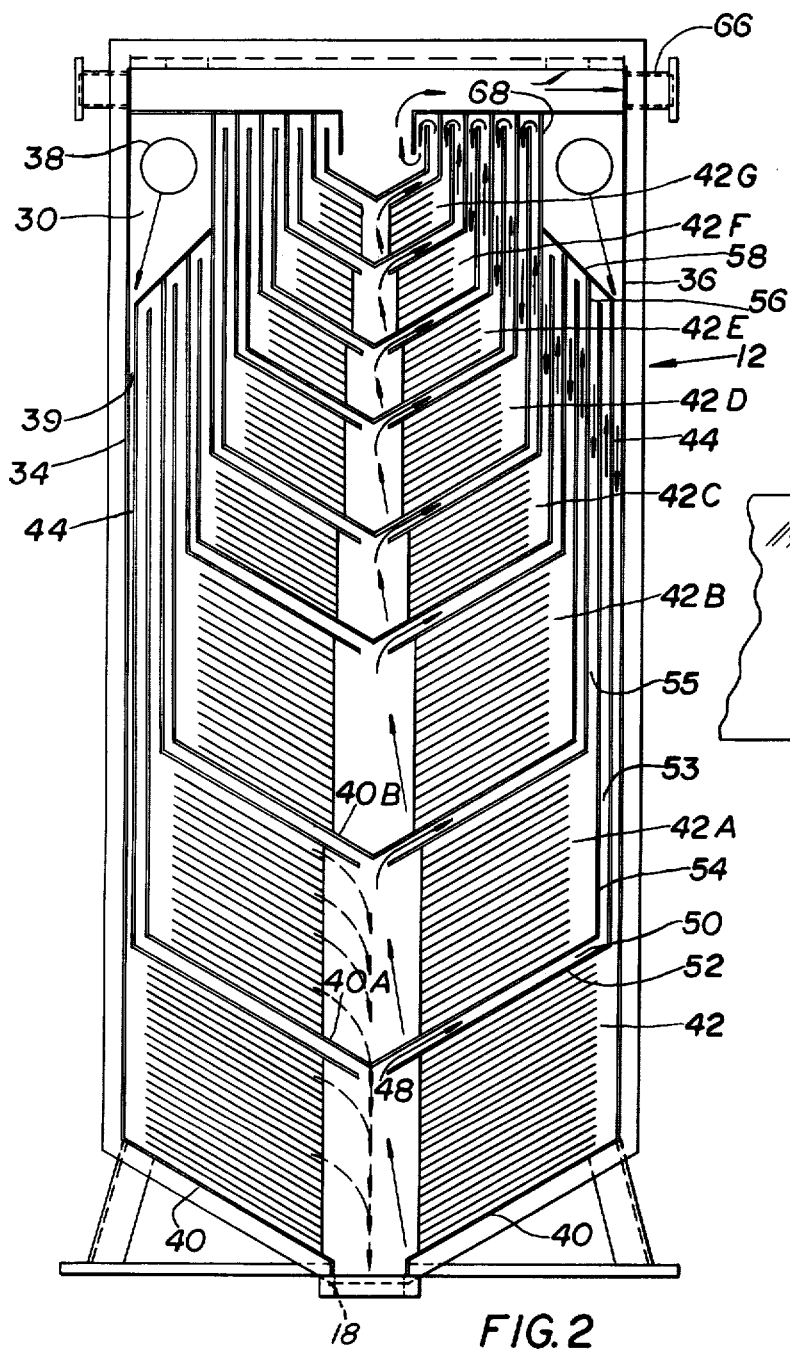
FIG. 2 is an enlarged vertical section, partially diagrammatic, of a liquid-solids separator module.
Figure 3:
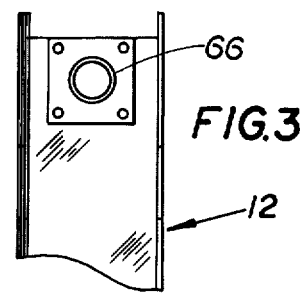
FIG. 3 is a fragmentary side elevation of the upper end of the module of FIG. 2.

Flow of the liquid-solids mix through the module 12 is of a controlled nature and the liquid-solids mix processed by the module is supplied thereto under suitable pressure for forcing the material into the module to flow therethrough in a controlled, upwardly stepped vertical path. Hence, the inlet or inlets 38 connect to a suitable conduit means 39 formed by a space between one of the end walls 34 and 36 and guide plates 44 secured in each of the modules and extending vertically between the side walls or plates spaced a short distance from each lateral margin of the module whereby the liquid-solids mix flows downwardly through the paths as indicated in FIG. 2 of the drawings down to the bottom chamber 42 to flow laterally inwardly and downwardly thereof, as indicated in the drawings. A plurality of nested or stacked trays 46 are positioned in the bottom chamber and with the trays terminating at their upper, outer ends spaced from the adjacent end wall 34 or 36 and with the lower, inner ends of the trays being spaced from an outer center area or zone 48 extending vertically of the module. Hence, as the module is filled with liquid-solids mix, vertically short separated layers of the mix individually flow over the different trays 46 in the bottom chamber and the solid material suspended therein or carried thereby has only a relatively short distance to move to start to collect on the upper surface of the individual trays 46. Such solids are moved by gravity and flow of the liquid-solids mix through the apparatus, and drop out of the mix onto the trays to slide slowly downwardly and inwardly of the apparatus to drop down vertically of the apparatus at the open center area 48 for collection adjacent the discharge outlet 18 of the module.

A discharge conduit extending from the bottom chamber 42 is indicated at 50, FIG. 2, in the drawings and this is formed between the bottom wall 40a of the intermediate chamber 42a and a guide plate 52 extending upwardly and outwardly of the bottom chamber 42 on each side thereof. Such plate 52 extends in toward but its inner end is spaced from the open center area 48 of the module. The plate 52 and an associated plate 54 connected to the outer end of the bottom wall 40a extend upwardly of the apparatus as a conduit 53 to connect to a conduit 55 formed between a surface of the plate 54 and an adjacent plate 56 at a distributor cap zone 58 in the module adjacent the upper end thereof. Then the liquid-solids mix flows downwardly of the module and laterally inwardly and downwardly in the intermediate chamber 42a between a plurality of stacked trays therein like the trays 46 for further deposit of the solids on the trays for gradual sliding action towards the center area of the settler.

In order to stack and space a plurality of trays in the different separating chambers in the separator module, these trays have upwardly and outwardly inclined side walls 60 at each margin thereof whereby the trays will stack or nest in spaced relationship with each other. The inner edges of the trays abut against a vertically extending guide or stop rod 62 that is secured to and extends between the lower surface of the plate 52 and the upper surface of the bottom wall 40 of the module. Hence, these guide rods initially limit the positions of the trays to aid in stacking them with the inner and outer ends thereof vertically aligned.

When constructing one of the modules 12 of the invention, all of the various metal plates forming the different conduits connecting the vertically spaced compartments of the module for controlled flow of the mix through the module, such as the plates 44, 52, 54, 58, 68, etc. are welded at one edge to the one face plate 30 of the module, and the edge plates 34 and 36 are likewise welded in place to such face plate. All of such plates are obviously of the same width. Also, all of the various individual trays 46 used in forming the various stacks of trays in the different compartments are loosely positioned in stacked relationship on top of each other and abutting at their inner edges against the support rods 62 which are secured in position, as between the bottom plate 40 and the top plate 52. All of such plates 40, 52, 40a, etc. are also welded at one edge to the face plates 30 and extend therefrom the width of the plates 44, etc. Normally these trays or plates 46 have edge flanges 47 thereon that are inclined outwardly of the trays at a very small acute angle so that the individual trays are supported on the upper ends of the flanges 47 on the tray therebelow. The trays are of the width of the plates 40, etc. At the opposite face of the module, a rubber or other elastic gasket sheet 32 is positioned. After the gasket sheet 32 is positioned on the opposite face of the module, then it is ready to be attached to an adjacent module 12 by any conventional means such as bolts or equivalent members 41. At that time, the trays 46 have their support and spacing flanges 47 thereon compressed or moved into substantially direct perpendicular relationship with the bottoms 46 of the trays whereby the flanges 47 extend vertically and the module would be sealed in relation to its adjacent module.

Figure 7:
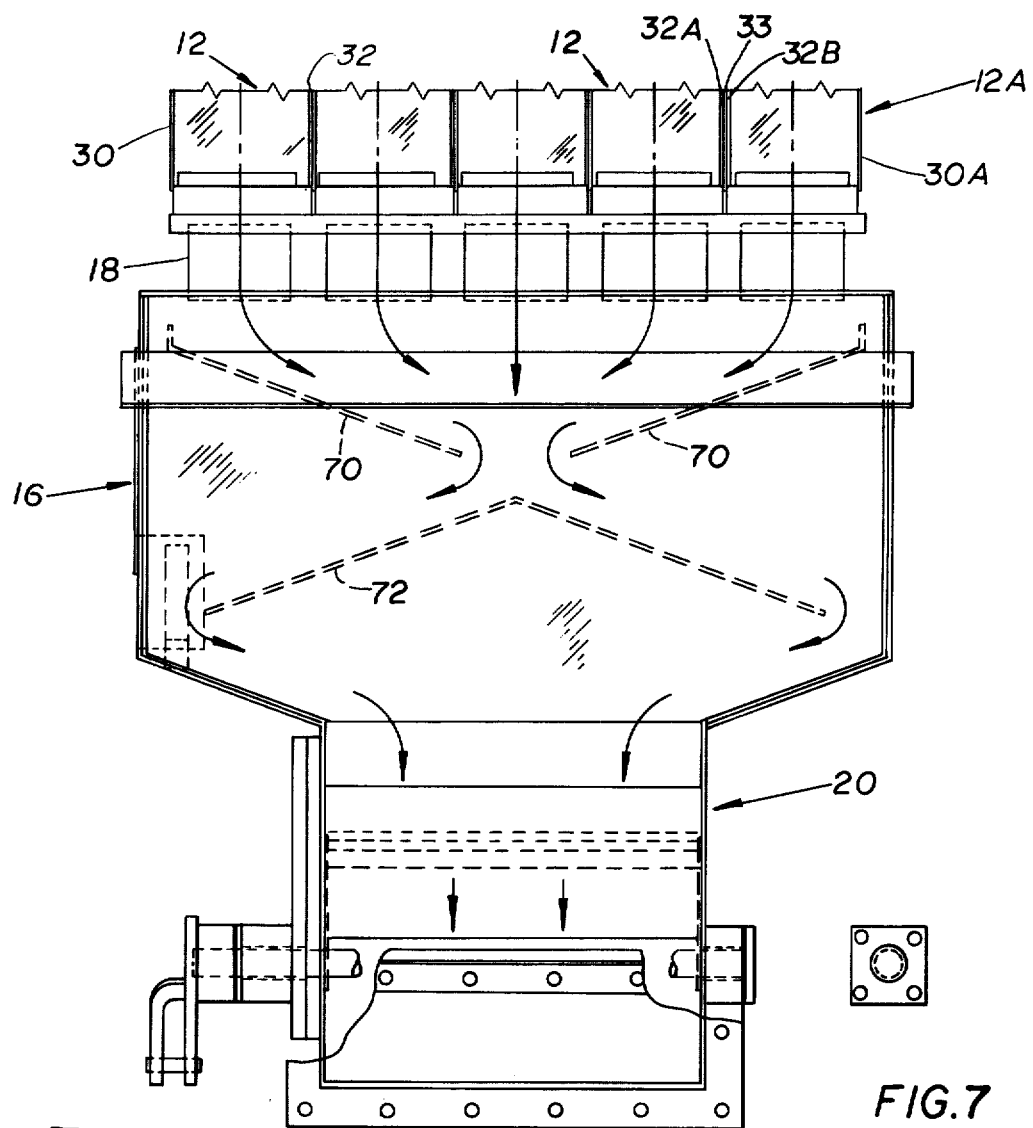
FIG. 7 is an enlarged elevation, partially diagrammatic, of the apparatus of FIG. 1, but particularly showing the collection and distribution means positioned below the separator modules of FIG. 1.
Figure 8:
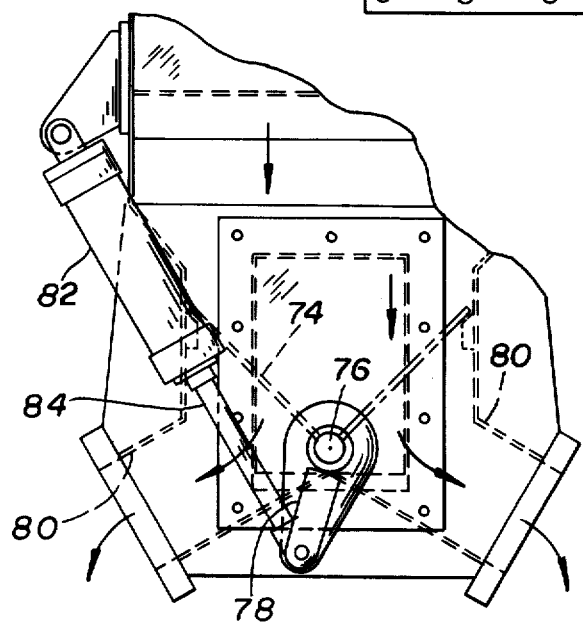
FIG. 8 is a left side elevation, fragmentary, of the apparatus of FIG. 7.

When securing an end module 12a, FIG. 7, to the remaining group of modules, a face sheet 30a is used for carrying all of the interior bottom, conduit, spacer and edge plates. Such face plate 30a in this instance would be on the righthand side of the module whereas the other modules have the carrier plates 30 provided on the lefthand face plate of the modules. I preferably provide gasket sheets 32a and 32b on the adjacent open faces of the abutted modules with one separation plate 33 also being positioned between the adjacent modules and between the two gasket sheets provided in the assembly. Then the entire assembly, as previously indicated, is bolted together to form the operative unit of the invention.

Assembly of the modules into operative association with each other effectively clamps the superimposed trays into opertive positions between the gasket plate 32 and the face plate 30 of the individual modules. Obviously the gasket sheets have suitable apertures provided therein at any inlet or outlet openings desired in the module face, and such gasket sheets seal the modules to provide separate watertight enclosures. Any suitable number of modules can be provided for parallel flow of a mix therethrough.

Figure 4:
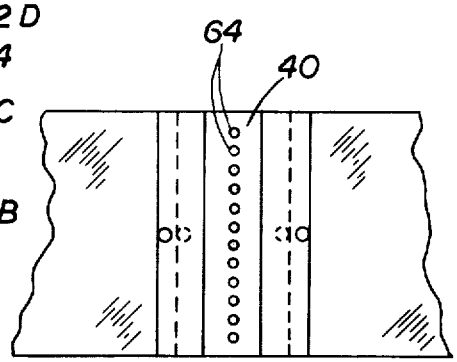
FIG. 4 is a fragmentary plan view taken on line 4—4 of FIG. 2.
Figure 6:
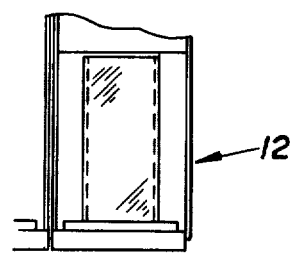
FIG. 6 is a fragmentary right side elevation of the module of FIG. 2.
Figure 5:
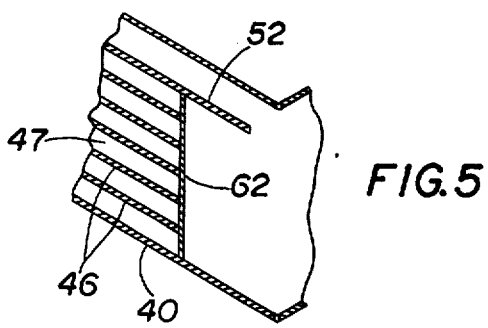
FIG. 5 is a fragmentary enlarged sectional view of a separator chamber and taken on line 5-5 of FIG. 2.

FIG. 4 of the drawings clearly shows that the bottom plates 40a of the chamber 42a has a plurality of small, laterally spaced holes 64 therein. These holes may be quite small such as about ¼ to ⅜ inch in diameter and they are formed at or adjacent the apex of the bottom wall 40a of the intermediate chamber for solids sliding down into the open center portion 48 of the module so that it can drop through such holes to the bottom compartment to discharge from the module.

The flow of the liquid-solid mix being processed continues in the same flow pattern as previously described through the next vertically adjacent chamber 42b from the chamber 40a and then progressively upwardly of the apparatus to and through all of the chambers, as indicated. Naturally, the mix being processed normally progressively becomes freer or suspended solids or carried solid matter therein and ultimately the liquid flows to the top of the module and can be discharged, for example, through an outlet 66 in the upper portion of the module for processing or discharge in any desired manner.

The continued flow of the material being processed is controlled by plates and conduits similar to those previously described for controlling the flow between the lowermost chamber 42 and the next adjacent or vertically above chamber 42a whereby liquid-solid mix is continually being permitted to flow downwardly and inwardly of the apparatus between closely vertically adjacent deposit trays of plurality of which are provided in each of the compartments of the apparatus. The distributor cap 58 has an extended section 68 provided at the center portion of the module connecting to a lower portion of the distributor cap for providing the controlled conduit flow path of the several vertically uppermost chambers.

The chambers 42, 42a, 42b, etc. are progressively shorter in length laterally of the module which is of balanced construction about the vertical centerline of the module as indicated in the drawings.

The collector means 16, as shown in FIG. 7, connects to a plurality of the modules 12 and the solids material discharged from each of the modules 12 naturally will include some liquid material therein. Such relatively concentrated liquids-solid mix flows inwardly of the collector 16 over a pair of laterally inwardly and downwardly inclined guides or settler plates 70 and then such mix flows over a pair of outwardly and downwardly inclined settler plates 72 to permit solids to settle from the mix being processed and aid in the liquid-solid separator action of the apparatus. From the lower end of the collector means 16, the mix then flows down into the distributor means 20. A guide plate 74 is positioned in the distributor 20 and extends the length thereof. Such guide plate 74 is carried by a support shaft 76 pivotally positioned by the distributor. The shaft 76 protrudes beyond the distributor means 20 and has a crank arm 78 secured thereto and extending substantially radially therefrom. The shaft 76 is adapted to be rotated through an arc in the distributor to move the guide plate 74 from an upward laterally outwardly inclined position engaging one lateral margin of the distributor over to an opposite position contacting the opposite lateral margin of the distributor for guiding the liquid-solid mix being processed into either of two alternate discharge throats 80 formed in the lower lateral margins of the distributor.

Figure 9:
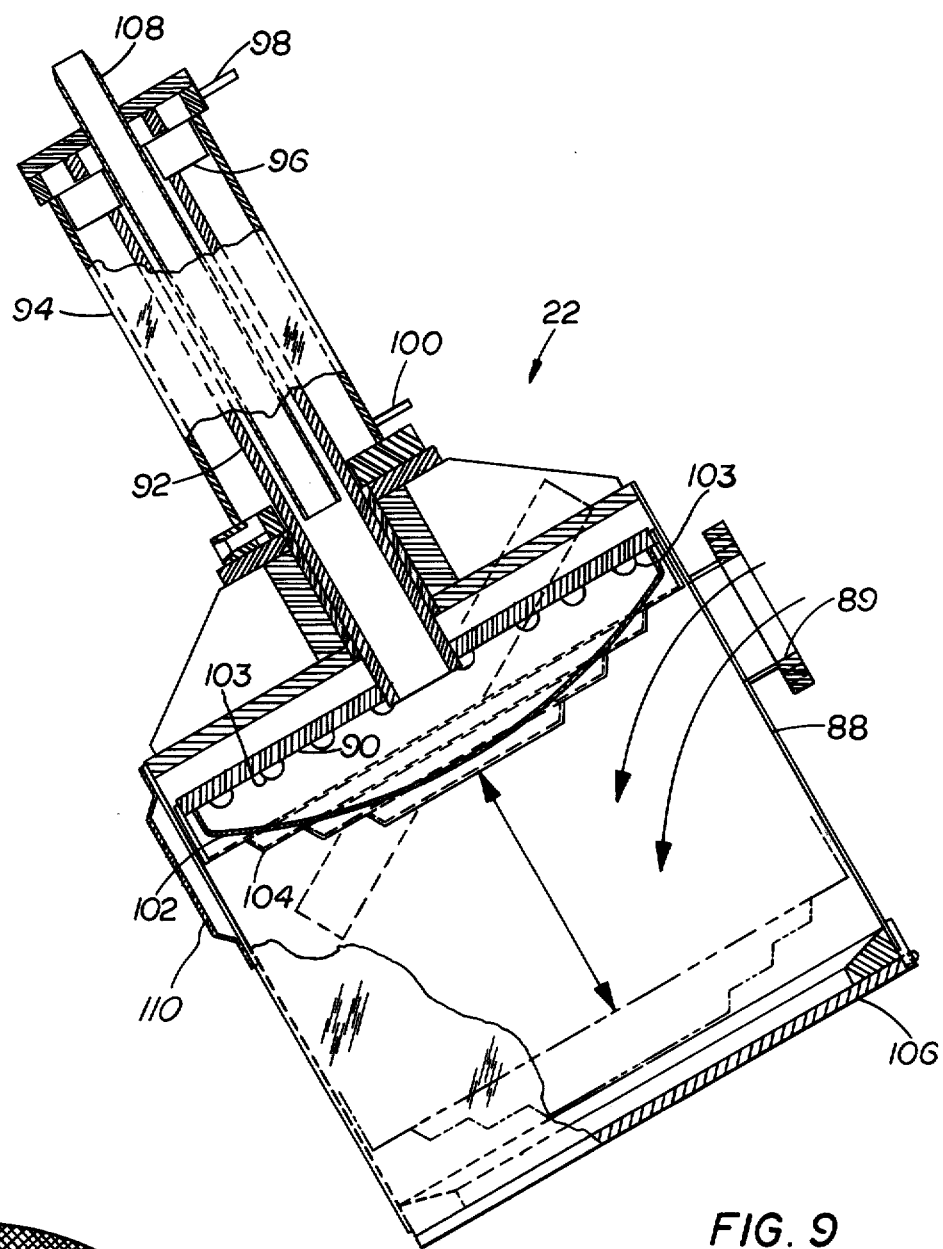
FIG. 9 is an enlarged sectional view taken on line 9—9 of FIG. 1.
Figure 10:
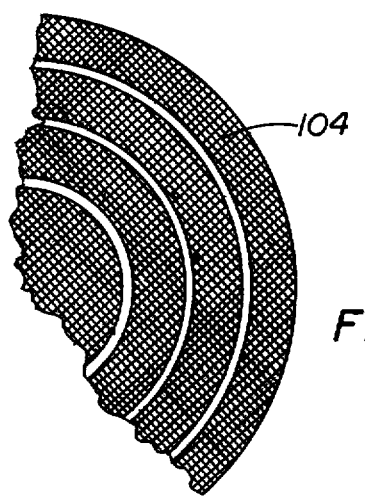
FIG. 10 is a fragmentary view taken on line 10—10 of FIG. 9.

Pivotal movement of the guide plate is provided by a suitable piston-cylinder member 82 pivotally secured at one end to a portion of the frame 14, or to the outer portion of the discharge means 20 so that a piston rod 84 extending from this piston-cylinder combination 82 can pivotally connect to and control an end of the crank arm 78. Hence, on actuation of the cylinder means 82 by power means connecting to the ends thereof, the piston rod 84 will positively move the guide plate 74 from one extreme guide position to the other for alternately guiding the mix being processed into one or the other of the discharge throats 80 at opposite laterally margins of the lower end of the distributor means for further processing in the compaction means 22 as shown in more detail in FIG. 9.

The compaction means 22 includes a cylindrical section 88 which has a piston 90 positioned therein for movement axially of the cylindrical section through controlled movement of a tubular piston rod 92 connecting to this piston 90. A side inlet 89 connects to the discharge throat 80. The piston rod 92 extends into an associated double acting hydraulic cylinder 94 secured to the cylindrical section 88 at one end thereof and such cylinder 94 has a piston 96 engaged with the piston rod 92 at the end thereof remote from the cylindrical section 88. Thus hydraulic fluid can be supplied to opposite ends of the cylinder 94 through conduits 98 and 100 connecting to opposite ends of the cylinder 94 for controlled movement of the piston 90 axially of the cylindrical section 88 for compaction action therein as explained hereinafter in more detail.

Preferably, the piston 90 has a dome or cup shaped cover 102 secured thereto and extending inwardly of the cylindrical section from the piston. Apertures 103 are provided in the base of the cover wall. A stepped porous screen-like cover means 104 is also secured to the piston in axially spaced relationship to the inner cover 102 for engaging the liquid solid mixture in the cylindrical section 88 to aid in forcing or compacting the solids and expelling residual water therefrom. The water is adapted to flow through the screen and cover means 104 and 102 to the rear face of the piston 92 which is not sealed in but is in sliding engagement only with the cylindrical section 88. Any suitable door 106 is provided on the open end of the cylindrical section 88 and such a door 106 is removed or opened at desired times for permitting the piston 96 to expel the collected solidified or compacted solid material from the compaction means 22.

As the piston 90 is retracted by the double acting cylinder 94, any water in the cylindrical section 88 will flow through and through or around the piston and can be drained from the cylindrical section 88 prior to entry of any additional liquid-solid mix therein.

As solids are compacted in the cylindrical section 88, some of them deposit on the covers 102 and 104. Hence, a tube 108 is secured to the axially outer or closed end of the cylinder 94 and such a tube is connected to a source 6f vacuum ]nd/or air pressure (not shown). The tube 108 extends partially into the tubular piston rod 92 and is in sealed engagement therewith. Hence, when a controlled air blast is provided to the tube 108, it will blast or force air against the inner surface of the covers 102 and 104 to remove any solid materials thereon, or during the piston pressure stroke vacuum from the tube can draw out surplus water. The compaction means 22 is normally positioned at an angle about as shown in the drawings, and solid materials carried by but discharged from the cover screens tend to collect in an offset section 110 provided in the cylindrical section 88 of the apparatus. This section 110 has a removable portion (not shown) provided thereon to permit discharge of these collected solids when desired, or the solids may slide around the piston for compaction in the unit.

The apertures 103 provided in the base of the wall of the dome shaped cover 102 on the piston 90 permit water flow to the interior of this cover 102 as the piston is advancing for compaction action. Also flow to the bore of the tubular piston 92 is provided.

As the thickened water-sludge mixture flows down into and through the collector means 16, the sludge just slides slowly over the plates 70 and 72 and the water tends to flow upwardly in this collector means and can even flow back up into the modules for upward flow therethrough for discharge action.

Obviously, when filling up the apparatus of the invention for settlement of solids from any water or liquid-solids mixture, the flow rate of the material into and through the settler apparatus of the invention can be at a reduced rate, if desired, to aid in obtaining an effective solids settling action on the processed material so that a satisfactory cleaning action is obtained on the material initially filling the settler apparatus.

In one typical settling action by apparatus of the invention, the solids-liquid mixture was detained about 8 minutes in the settler apparatus and approximately 95% of the solids in the initial liquid mix were removed.

Obviously any suitable automatic controls can be provided to actuate the compactor means 22 at suitably timed intervals in relation to the action and control on the distributor member 20 and transmission of the sludge to the compactor units.

In some instances, when desired, the collector means 16 might be removed and the liquid-sludge could flow from the different modules 12 down into the distributor member 20 or equivalent means used in combination with the modules. Or, in some instances, it may be desired to have the sludge flow down into the collector unit 16 and have a compactor member receive the sludge-liquid mix from the collector. Any suitable number of the compactor units could be provided in association with the collection unit 16 at spaced portions thereof.

Any suitable controlled pressure supply of the mix to the apparatus forces the mix into and through the apparatus at a desired rate.

The apparatus of the invention is adapted to function efficiently and relatively rapidly for permitting the dropping out of solids from vertically narrow sections of the processed material as such sections of the liquids mix being processed flow over the individual trays in the different compartments provided. Hence, the solids effectively deposit and collect at the center portion of the modules for gravity flow downwardly of the apparatus into the collector and compaction means used in the apparatus. The novel flow patterns provided by the invention form a new method of separation of solids from a liquid-solids mix. The apparatus can be made of sturdy construction and it will provide a good service life with minimum maintenance thereon. Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. Solids settler apparatus for liquid-solid mixtures comprising:

a plurality of abutted flat separator modules each including a plurality of vertically spaced separator chambers each having a pair of downwardly and inwardly inclined stacks of settler means therein; a center solids collecting zone; a bottom solids discharge outlet; and conduit means leading from an upper portion of the lowermost chamber to the next vertically adjacent chamber and from such adjacent chamber to the chamber vertically there adjacent and repeating to the top one of said chambers; said settler means comprising trays, and each of said modules include a face carrier plate, a bottom plate, and a pair of side plates, said conduit means comprising plates extending from said carrier plate, all of said plates being secured at one edge thereof to said carrier plate and extending therefrom a uniform distance, and an opposed closure plate at the oppsite face of the module and sealed against the other edges of said plates, said conduit means comprising conduit forming plates connecting to an input for each chamber at the laterally outer ends thereof and with at least one of said conduit forming plates being at a center upper portion of each chamber to air in forming an outlet thereof to connect to the inlet for the next vertically above adjacent chamber, all of said conduit forming plates being secured at one edge to said carrier plate, the trays of each stack being closely adjacent vertically to one another for flow of the liquid-solid mixture inwardly and downwardly over the trays to an open center solids collecting zone in each chamber.

2. Solids settler apparatus as in claim 1 where in each module of each of said chambers except for a bottom chamber has bottom plates therein forming a V extending across the chamber to separate it from an adjacent chamber, said V shaped bottom plates having a number of small solids transmission holes formed therein.

3. A settler apparatus for processing liquid-solid mixtures and the like supplied thereto under pressure for flow therethrough and comprising:
 an elongated enclosure adapted to be positioned in a vertical plane,
 means forming a plurality of vertically spaced V-shaped settling chambers each having a bottom wall in said enclosure and including a lowermost chamber, intermediate chambers, and a top chamber,
 each said chamber including two sets of trays each set of which is inclined in an opposite direction inwardly and downwardly of said enclosure, each of said sets comprising a plurality of trays having edge flanges thereon and said trays being stacked upon each other in vertically spaced relation, upper rear ends of said trays being spaced from lateral margins of said enclosure and the lower inner ends of said trays being spaced from the center of said enclosure to leave a vertically directed opening between said sets of trays,
 inlet means for a liquid solid mixture connecting to the outer ends of said trays in said lowermost chamber to form a common inlet therefor,
 further conduit means connecting to said vertically directed opening at the upper portion of the center of said lowermost chamber and extending upwardly therefrom to connect to and form a common inlet for said trays in the vertically adjacent intermediate chamber at the laterally outer margins thereof,
 other conduit means similar to said further conduit means for series flow of the mixture being processed to the adjacent vertically higher chamber and ultimately to said top chamber, and
 an outlet means operatively connecting to said center opening at the upper end of said enclosure.

4. Settler apparatus as in claim 3 and including the bottom walls of all of said chambers forming the vertically spaced V's and having a plurality of spaced small apertures at or adjacent the apex of the V for solids depositing out of said mixture and sliding to such apex, and
 a solids deposit opening being formed at the center of the lowermost chamber.

5. Solids settler apparatus for liquid-solid mixtures comprising:
 a plurality of abutted flat separator modules each including a plurality of vertically spaced separator chambers each having a pair of opposed laterally extending and downwardly and inwardly inclined stacks of settler means therein, a center solids collecting zone; said pairs of stacks of settler means having lower discharge ends spaced laterally from each other at said center solids collecting zone and having upper, laterally outer input ends, a bottom solids discharge outlet; conduit means leading from an upper center portion of the solids collecting zone of the lowermost chamber to the input ends of the next vertically adjacent chamber and from such adjacent chamber to the chamber vertically there adjacent and repeating to the top one of said chambers, and input means connecting to the input ends of the lowermost chamber.

6. Solids separation apparatus as in claim 5 where said settler means comprise trays having edge flanges thereon, and a plurality of such trays are stacked on top of each other and supported in spaced relation by said edge flanges, each of said stack of trays having common input and discharge areas for the trays forming such stack.

7. Solids settler apparatus as in claim 5 where in each module each of said chambers except for a bottom chamber has bottom plates therein forming a V extending across the chamber to separate it from adjacent chamber, the apex of such V being in said center solids collecting zone, said V-shaped bottom plates having a number of small solids transmission holes formed therein at the apex of such plates to enable solids to pass downwardly of the apparatus.

8. Solids separator apparatus as in claim 5 where said pair of stacks of said settler means are of progressively decreasing lateral width in the progressively higher chambers.

9. A method of settling solids from a solid-liquid mixture in an enclosure comprising the steps of
 a. flowing the mixture into the enclosure to the bottom chamber formed therein,
 b. passing the mixture downwardly and inwardly in the chamber to a vertically open center area in a plurality of separate vertically narrow streams for solids deposit therefrom and in the chamber,
 c. forcing the solids-liquid mixture from an upper portion of said center area laterally outwardly and upwardly to the laterally outer ends of a second chamber vertically above and immediately adjacent the bottom chamber,
 d. repeating the flow of the mixture downwardly and inwardly of the second chamber in the plurality of separate vertically narrow streams and then outwardly and upwardly to a third vertically higher chamber in the same manner as in step (c) for additional separation therein,
 e. discharging liquid from the top of the enclosure, and
 f. discharging the separated solids at the bottom of the enclosure.

10. A method as in claim 9 including
 g. repeating steps (c) and (d) for any vertically higher chambers, and
 h. enabling separated solids to move by gravity from an upper chamber to the chamber therebelow at the center area of such upper chamber.

* * * * *

UNITED STATES PATENT OFFICE
CERTIFICATE OF CORRECTION

Patent No. 3,919,084  Dated  Nov. 11, 1975

Inventor(s)  Michael J. Bebech

It is certified that error appears in the above-identified patent and that said Letters Patent are hereby corrected as shown below:

Column 1, line 45, change "chambers" to -- chamber --

Column 3, line 26, change "compacts" to -- compacted --

Column 6, line 33, change " ouotwardly" to -- outwardly --

Column 6, line 62, change "hydrualic" to -- hydraulic --

Column 7, line 32, change "6f" to -- of --; same line, change ]nd/or to -- and/or --

Signed and Sealed this twenty-fourth Day of February 1976

[SEAL]

Attest:

RUTH C. MASON
*Attesting Officer*

C. MARSHALL DANN
*Commissioner of Patents and Trademarks*